United States Patent
Yamane et al.

(10) Patent No.: US 8,022,161 B2
(45) Date of Patent: *Sep. 20, 2011

(54) PERFLUOROPOLYETHER-ORGANOPOLYSILOXANE COPOLYMER AND A SURFACE TREATMENT COMPOSITION COMPRISING THE SAME

(75) Inventors: Yuji Yamane, Annaka (JP); Noriyuki Koike, Takasaki (JP); Hirofumi Kishita, Annaka (JP); Koichi Yamaguchi, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 11/898,013

(22) Filed: Sep. 7, 2007

(65) Prior Publication Data

US 2008/0071042 A1 Mar. 20, 2008

(30) Foreign Application Priority Data

Sep. 8, 2006 (JP) ................................. 2006-243580
Aug. 21, 2007 (JP) ................................. 2007-215233

(51) Int. Cl.
*C08G 77/46* (2006.01)
(52) U.S. Cl. ............... 528/35; 524/462; 528/25; 528/31
(58) Field of Classification Search .................. 525/474; 528/25, 31, 35
See application file for complete search history.

(56) References Cited

U.S. PATENT DOCUMENTS

| | | | |
|---|---|---|---|
| 4,565,714 A * | 1/1986 | Koshar ........................... | 427/515 |
| 4,765,729 A | 8/1988 | Taniguchi et al. | |
| 6,204,350 B1 * | 3/2001 | Liu et al. ........................... | 528/23 |
| 6,425,294 B1 | 7/2002 | Shiono et al. | |
| 6,958,191 B2 | 10/2005 | Yamaguchi et al. | |
| 7,196,212 B2 | 3/2007 | Yamaguchi et al. | |
| 2007/0149746 A1 | 6/2007 | Yamane et al. | |
| 2007/0197758 A1 | 8/2007 | Yamane et al. | |
| 2010/0112915 A1 * | 5/2010 | Annaka ........................... | 451/384 |

FOREIGN PATENT DOCUMENTS

| | | |
|---|---|---|
| EP | 1 300 433 A2 | 4/2003 |
| JP | 58-167597 A | 10/1983 |
| JP | 6-5324 A | 1/1994 |
| JP | 11-029585 A | 2/1999 |
| JP | 2000-143991 A | 5/2000 |
| JP | 2001-99737 A | 4/2001 |
| JP | 2003-238577 A | 8/2003 |
| JP | 2007-197425 A | 8/2007 |
| JP | 2007-297589 A | 11/2007 |

* cited by examiner

*Primary Examiner* — Marc S Zimmer
(74) *Attorney, Agent, or Firm* — Birch, Stewart, Kolasch & Birch, LLP

(57) ABSTRACT

A perfluoropolyether-polyorganosiloxane copolymer comprising at least one perfluoropolyether block, at least one polyorganosiloxane block which may has a silalkylene group, and two monovalent groups represented by the following formula (1), each one at both ends of the copolymer,

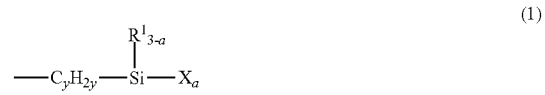

(1)

wherein X is a hydrolyzable group, $R^1$ is an alkyl group having 1 to 4 carbon atoms or a phenyl group, y is an integer of from 1 to 5, and a is an integer of 2 or 3,
said copolymer having a number average molecular weight, reduced to polystyrene, of from 7,000 to 25,000.

13 Claims, 7 Drawing Sheets

PERFLUOROPOLYETHER-ORGANOPOLYSILOXANE COPOLYMER AND A SURFACE TREATMENT COMPOSITION COMPRISING THE SAME

CROSS REFERENCES

This application claims benefit of Japanese Patent application No. 2006-243580 filed on Sep. 8, 2006, and Japanese Patent application No. 2007-215233 filed on Aug. 21, 2007, the contents of which are hereby incorporated by reference.

FIELD OF THE INVENTION

The present invention relates to a perfluoropolyether-organopolysiloxane copolymer, specifically to the one comprising a perfluoropolyether block, an organopolysiloxane block, and terminal hydrolyzable groups. In addition to the properties of the both blocks, the copolymer has excellent adhesion to a substrate and curing property. The present invention also relates to a surface treatment composition comprising the copolymer.

BACKGROUND OF THE INVENTION

Compounds containing perfluoropolyether moieties generally have very small surface free energy to have water and oil repellency, chemical resistance, lubricity, releasing property, and antifouling property. Making use of these properties, they are widely used as, for example, treatment agents to make paper or fiber water- and oil-repellent, and foul-resistant, lubricants for magnetic storage media, oil repellent agents for precision apparatuses, releasing agents, cosmetics, and protective films.

Particularly, a curable perfluoropolyether is used for various applications due to its characteristics of fluoroalkylether. For example, Japanese Patent Application Laid-Open No. 2001-099737 describes a cured product in the form of gel which is resistant to chemicals and solvents, moisture penetration, and is used for a protective coating of a semiconductor pressure sensor and electric circuit.

Meanwhile, it is well known that an organic compound can be bonded to a surface of glass or cloth via a silane coupling agent. The silane coupling agent has an organic functional group and a reactive silyl group, usually an alkoxy silyl group. The alkoxy silyl groups are autocondensed in the presence of moisture to form a siloxane coating film. At the same time, the alkoxy silyl group chemically bonds to glass or metal surface to form a durable film. The silane coupling agents are thus widely used as coating agents for various substrates.

Japanese Patent Application Laid-Open No. S58-167597 discloses a fluoroaminosilane compound represented by the following formula:

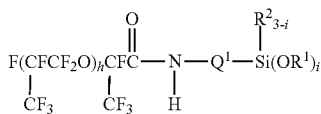

wherein $R^1$ and $R^2$ are alkyl groups having 1 to 4 carbon atoms, $Q^1$ is $CH_2CH_2CH_2$ or $CH_2CH_2NHCH_2CH_2CH_2$, h is an integer of from 1 to 4, and i is 2 or 3.

The perfluoropolyether moiety of the compound, however, is relatively short, i.e., from a dimer to a pentamer of hexafluoropropylene oxide, so that the aforesaid characteristics of the perfluoropolyether are not significant.

Japanese Patent Publication of Examined Application No. 6-5324 discloses an antireflection film having improved antifouling property. The layer is formed on an antireflective monolayer or multilayer mainly composed of silicon dioxide deposited by PVD method. The layer is composed of organopolysiloxane polymer or perfluoroalkyl group-containing polymer.

Fouling by human secretion and fingerprint, however, is difficult to wipe off from the layer and tends to extend to form a thin oily film. When it is rubbed strongly, the antireflection film itself is damaged.

Japanese Patent Application Laid-Open No. 11-29585 and 2000-143991 disclose an antireflection film having an antifouling layer prepared from a perfluoropolyether-modified aminosilane represented by the following formula:

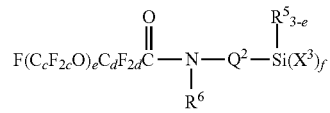

wherein $X^3$ is a hydrolyzable group, $R^5$ is a lower alkyl group, $R^6$ is a hydrogen atom or a lower alkyl group, $Q^2$ is $CH_2CH_2CH_2$ or $CH_2CH_2NHCH_2CH_2CH_2$, e is an integer of from 6 to 50, f is 2 or 3, and c and d are integers of from 1 to 3.

Drawbacks of the antireflection film are a relatively long time required to be cured and weak adhesion to a substrate.

Japanese Patent Application Laid-Open No. 2003-238577 discloses a silane coupling agent which contains a perfluoropolyether moiety represented by the following formula:

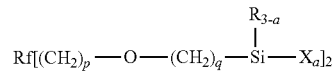

wherein Rf is a divalent linear perfluoropolyether group, R is a $C_{1-4}$ alkyl or phenyl group, X is a hydrolyzable group, p is an integer of from 0 to 2, q is an integer of from 1 to 5, and a is 2 or 3.

A coating prepared from the aforesaid silane coupling agent has strong adhesion to a substrate, resistant to fouling and a slick surface resistant to scrubbing.

Even treating a surface with these agents, fouling cannot be prevented perfectly. One has to scrub the surface to remove the fouling quite often. Moreover, the treated surface is not satisfactory in resistance to scrubbing, ease of scrubbing or slickness of the surface.

SUMMARY OF THE INVENTION

To improve the aforesaid surface treatment agent, the present inventors had made extensive studies and filed Japanese Patent Applications No. 2006-343447 and No. 2007-4899 on a surface treatment agent having a specific polyorganosiloxane moiety.

The present invention is intended to further improve the surface treatment agent particularly in solubility in a solvent and resistant to scrubbing.

The present invention is a perfluoropolyether-polyorganosiloxane copolymer comprising at least one perfluoropolyether block, at least one polyorganosiloxane block which may has a silalkylene group, and two monovalent groups represented by the following formula (1), each one at both ends of the copolymer,

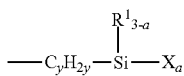

(1)

wherein X is a hydrolyzable group, $R^1$ is an alkyl group having 1 to 4 carbon atoms or a phenyl group, y is an integer of from 1 to 5, and a is an integer of 2 or 3, said copolymer having a number average molecular weight, reduced to polystyrene, of from 7,000 to 25,000.

The present invention also provides a surface treatment composition comprising the perfluoropolyether-polyorganosiloxane copolymer and/or a partial condensate of hydrolyzates thereof.

The perfluoropolyether-polyorganosiloxane copolymer of the present invention has terminal hydrolyzable groups and can be cured at room temperature or an elevated temperature to from a coating layer whose surface is water- and oil-repellent, and slick. The coating adheres strongly to a substrate and resistant to scrubbing. Having the polyorganosiloxane block, the perfluoropolyether-polyorganosiloxane copolymer has better solubility than conventional perfluoropolyether surface treatment agent and therefore can be used for various applications such as a lubricant.

PREFERRED EMBODIMENTS OF THE INVENTION

Figure 1:
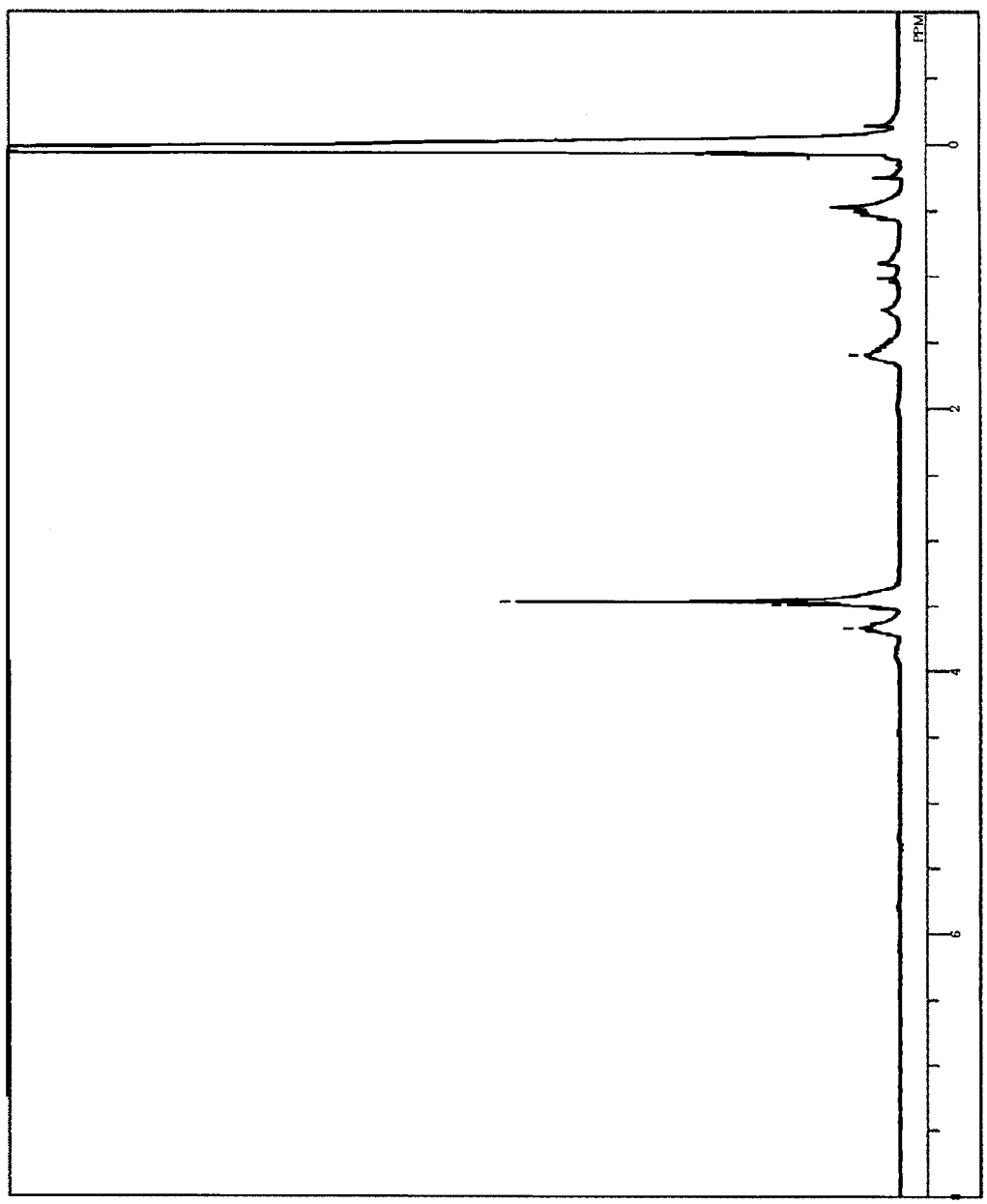
FIG. 1 is a $^1$H-NMR chart of Copolymer 1 prepared in Example 1.

The perfluoropolyether-polyorganosiloxane copolymer of the present invention has a group represented by the following formula (1) at both ends of the copolymer.

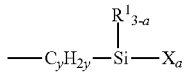

(1)

In the formula (1), X is a hydrolyzable group which may be different from each other. Examples of the hydrolyzable group include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; halogen atoms such as chlorine, bromine, and iodine atoms. Among these, methoxy, ethoxy, iropropenoxy groups and chlorine atom are preferred.

$R^1$ is an alkyl group having 1 to 4 carbon atoms such as methyl and ethyl groups, or a phenyl group, among which a methyl group is preferred; a is 2 or 3, preferably 3, because of higher reactivity and stronger bonding to a substrate; and y is an integer of from 1 to 5, preferably from 2 to 5.

The perfluoropolyether block comprises plurality of repeating units represented by the following general formula $$—C_jF_{2j}O—$$

wherein j is an integer of from 1 to 6, preferably from 1 to 4. If the perfluoropolyether block comprises two or more of the perfluoropolyether blocks, j of each block may be different from each other.

Examples of the aforesaid repeating unit include linear and branched unit as shown below.

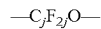

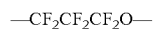

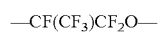

The perfluoropolyether block may be a combination of two or more of these repeating units. Preferably, the perfluoropolyether block is represented by the following formulas (3), (4) or (5).

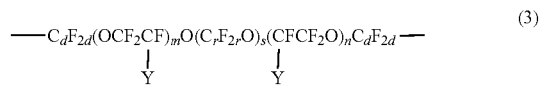

(3)

wherein Y is F or $CF_3$, which may be different with each other, and r is an integer of from 2 to 6, d is an integer of from 1 to 3, each of m and n is an integer of from 0 to 200 with m+n ranging from 2 to 200, s is an integer of from 0 to 6, and the repeating units such as ($C_rF_{2r}O$) may be bonded randomly;

(4)

wherein l is an integer of from 1 to 200, and d is an integer of from 1 to 3;

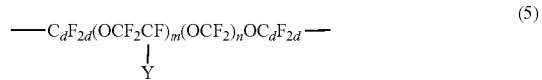

(5)

wherein Y is F or $CF_3$, d is an integer of from 1 to 3, each of m and n is an integer of from 0 to 200 with m+n ranging from 2 to 200, and the repeating units may be bonded randomly.

More preferably, a total number of the repeating units ranges from 1 to 60, most preferably from 10 to 50. Particularly preferred is the block represented by the following formula (6),

(6)

wherein m is an integer of from 0 to 50, and n is an integer of from 0 to 50 with n+m ranging from 2 to 60, which corresponds to the above formula (5) with d being 1 and Y being F, because a cured coating from a copolymer comprising the block has excellently slick surface.

The polyorganosiloxane block is preferably a linear block comprising a plurality of the organosiloxane repeating units represented by the following formula (7)

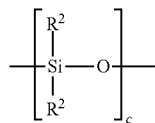

(7)

wherein $R^2$ may be the same with or different from each other and is a $C_{1-4}$ alkyl group or a phenyl group, c is an integer of from 2 to 200, preferably from 2 to 100, more preferably from 10 to 60. The repeating units may be connected via a silalkylene group to form —Si—$C_kH_{2k}$—Si—, wherein k is an integer of from 2 to 4.

Examples of the polyorganosiloxane block are as shown below in which Me represents a methyl group and Ph represents a phenyl group.

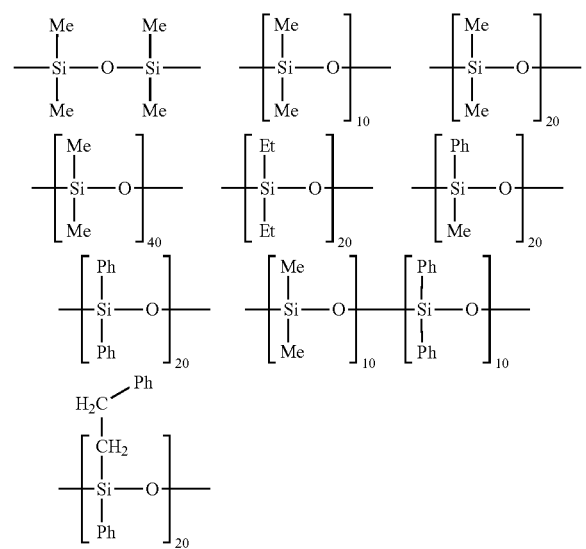

The aforesaid perfluoropolyether block represented as Rf and the polyorganosiloxane block as W are connected preferably via a connecting group Q to constitute a backbone of the copolymer as shown in the following formula (2).

—(Rf-Q)$_h$-(W-Q-Rf-Q)$_g$-W-(Q-Rf)$_i$—   (2)

In the formula (2), Q is a divalent connecting group having 2 to 12 carbon atoms and may contain a bond comprising an oxygen and/or nitrogen atom, such as the one selected from the group consisting of amide, ether, and ester bonds. Examples of Q are as shown below, wherein the left end of each group is bonded to Rf, and the right end to W.

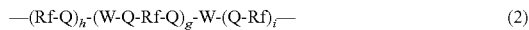

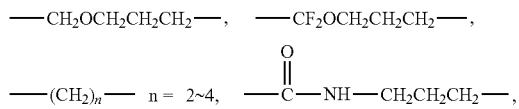

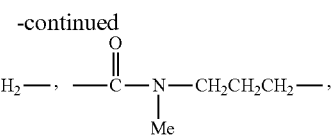

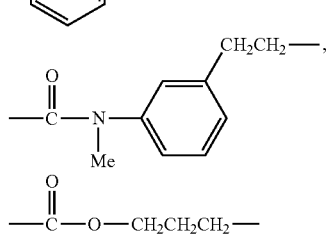

Preferably, Q is represented by the following formula.

—CH$_2$OCH$_2$CH$_2$CH$_2$—

In the formula (2), g is an integer of from 0 to 10, preferably from 0 to 2, each of h and i is an integer of 0 or 1. Preferred backbones are the one represented by the formula (2-1) with g=0, and h=i=1 in the formula (2)

—Rf-Q-W-Q-Rf—   (2-1);

the one represented by the formula (2-2) with g=1, and h=i=0 in the formula (2)

—W-Q-Rf-Q-W—   (2-2); and the one represented by the formula (2-3) with g=1, and h=i=1 in the formula (2)

—Rf-Q-W-Q-Rf-Q-W-Q-Rf—   (2-3).

The group of the aforesaid formula (1) comprising the hydrolyzable group X may be bound directly to the backbone or via the group represented by the following formula, -Q(Z)$_k$- wherein Q is the aforesaid connecting group, and Z is a divalent organosiloxane residue having 1 to 8 silicon atoms which may comprise a silalkylene group, and k is an integer of 0 or 1. The group of the formula (1) is bound to a silicon atom of Z when k is 1.

Examples of Z are as shown below

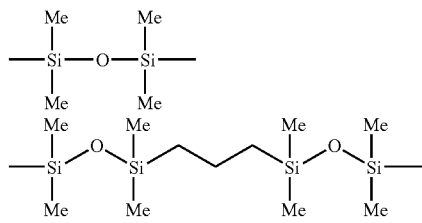

wherein one of the terminal free chemical bonds is bound to Q and the other one to the group of the formula (1).

Among the backbones of the formula (2), those with h=i=1, that is, the backbones having terminal perfluoropolyether blocks are bound to the group of the formula (1) preferably via the aforesaid group, -QZ-.

The perfluoropolyether-polyorganosiloxane copolymer of the present invention has a number average molecular weight, reduced to polystyrene of from 7,000 to 25,000, preferably from 10,000 to 20,000. A copolymer having a number average molecular weight smaller than the aforesaid lower limit may not give a coating with a slick surface. On the other hand, a copolymer having a number average molecular weight larger than the aforesaid upper limit may not give a coating resistant to scrubbing. The number average molecular weight can be measured by gel permeation chromatography.

Preferably, the perfluoropolyether-polyorganosiloxane copolymer contains silicon atoms in an amount of 3 to 30 wt %, preferably from 5 to 25 wt %, based on a weight of the perfluoropolyether-polyorganosiloxane copolymer. A copolymer having silicon content smaller than the aforesaid lower limit tends to have poorer solubility in organic solvents. On the other hand, a coating made from a copolymer having silicon content larger than the aforesaid upper limit tends to have worse oil- and water-repellency due to relatively smaller fraction of the perfluoropolyether block. The silicon content of the copolymer can be determined by NMR, for instance, and that of a coating can be determined by X-ray Fluorescent Spectroscopy or X-ray Photoelectron Spectroscopy.

The present organopolysiloxane can be prepared by the following method. Firstly, a compound having unsaturated bonds Q' at both ends of Rf and an organohydrogenpolysiloxane having hydrogen atoms bound to terminal Si atoms of W are subjected to an addition reaction as shown in the following chemical reaction formula $$2(Q'RfQ')+HWH \rightarrow Q'RfQWQRfQ'$$

in the presence of an addition reaction catalyst such as a platinum compound in a conventional manner.

Examples of Q' are as shown below.

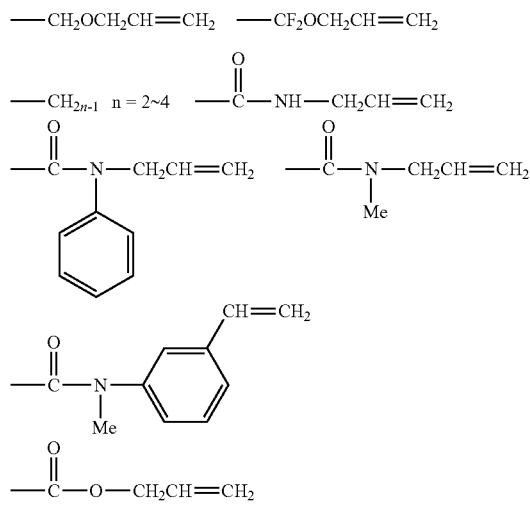

Separately, a compound having an unsaturated bond and the hydrolyzable group X of the formula shown below

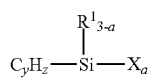

wherein $R^1$, X, a, y are as defined above and z equals (2y−1), is reacted with an organohydrogenpolysiloxane having terminal SiH bonds are subjected to an addition reaction according to a conventional manner to prepare an organohydrogenpolysiloxane containing the hydrolyzable group X.

The SiH bond of the obtained organohydrogenpolysiloxane containing the hydrolyzable group X is then addition-reacted with the remaining unsaturated bond of the aforesaid compound Q'RfQ', whereby a copolymer having a backbone of the above formula (2-1) with the group (1) bound to each ends of the backbone via ZQ represented by the following formula is obtained.

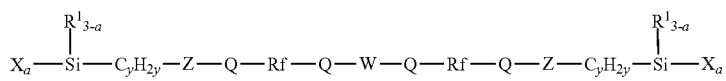

The backbone structure of the formula (2-2) can be prepared by the following addition reaction $$Q'RfQ'+2HWH \rightarrow HWQRfQWH$$

wherein Q', Rf, and W are as defined above, followed by addition reaction of the terminal H atoms with a compound having an unsaturated bond and the hydrolyzable group X of the formula shown below.

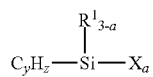

The present invention also provides a surface treatment composition comprising the perfluoropolyether-polyorganosiloxane copolymer of the present invention. The surface treatment composition is applied to various kinds of substrates. The applied composition is cured at room temperature or an elevated temperature to form a coating which has a slick, water- and oil-repellent, and scrub-resistant surface. The composition may contain partial condensation products of hydrolyzates of the organopolysiloxane which can be obtained by subjecting the organopolysiloxane to hydrolysis and condensation reactions in a conventional manner.

The surface treatment composition may comprise a catalyst for hydrolysis and condensation reactions. Examples of the catalyst include organic tin compounds such as bibutyltin dimethoxide and dibutyltin dilaurate; organic titanium compounds such as tetra-n-butyl titanate; organic acids such as acetic acid, methanesulfonic acid and perfluorocarboxylic acid; and inorganic acids such as hydrochloric acid and sulfuric acid, among which acetic acid, tetra-n-butyl titanate, and dibutyltin dilaurate are preferred. A content of the catalyst may be a catalytic amount, which typically ranges from 0.01 to 5 parts by weight, particularly from 0.1 to 1 part by weight per 100 parts by weight of the organopolysiloxane and/or partial condensate of hydrolyzate thereof.

The surface treatment composition may comprise a solvent. Examples of the solvent include fluorine-modified aliphatic hydrocarbon solvents such as perfluoroheptane and perfluoroctane; fluorine-modified aromatic hydrocarbon solvents such as m-xylenehexafluoride and bezotrifluoride; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine, and perfluorotripentylamine; hydrocarbon solvents such as petroleum benzene, mineral spirits, toluene, and xylene; ketone solvents such as acetone, methylethylketone, and methylisobutylketone. Among these, fluorinated solvents such as m-xylenehexafluoride, perfluoro(2-butyltetrahydrofuran), perfluorotributylamine and ethyl perfluorobutyl ether are preferred because of their higher dissolving capability and substrate wettability.

A mixture of two or more of the aforesaid solvents may be used. Preferably, the present perfluoropolyether-organopolysiloxane copolymer and/or partial condensation products of hydrolyzates thereof is dissolved homogeneously. A concentration of the perfluoropolyether-organopolysiloxane copolymer and/or partial condensate of hydrolyzates thereof is in the range of from 0.01 to 50 wt %, particularly from 0.05 to 20 wt %.

The surface treatment composition may be applied to a substrate by any known methods such as brushing, dipping, spraying and vapor deposition. Applied composition is processed at a temperature selected depending on the application method. When applied by brushing or dipping, the composition is processed at a temperature preferably of from room temperature to 120° C., more preferably in a humidified environment to promote curing reaction. A cured coating layer of the composition typically has a thickness of from 0.1 nm to 5 μm, particularly from 1 to 100 nm.

The present surface treatment composition may be applied to a substrate such as paper, cloth, metal and metal oxide, glass, plastic, or ceramics to provide its surface water and oil repellency, releasing property, and foul resistance.

The present surface treatment composition can be used for various applications, for example, fingerprint- or sebum-proof coating of optical parts such as spectacle lenses, and antireflection filter; water repellent or antifouling coating of sanitary products such as bathtubs and wash-basins; antifouling coating of window glasses of automobiles, trains, airplanes, and headlamp covers; water repellent or antifouling coating of exterior wall materials; oil-repellent coating of kitchen architectural material; fingerprint-proof coating of compact disks or DVD. It may be used also as a coating additive, a resin improver, releasing agent for nanoimprinting, releasing agent for metal mold, a dispersion or flow improver for inorganic filler, and a lubricity improver for tape or film.

EXAMPLES

The present invention is explained with reference to the following examples, but not limited thereto.

Example 1

In a reactor, were placed 30 g of perfluoropolyether compound having unsaturated bonds at both ends represented by the following formula (I), $$CH_2=CH-CH_2-O-CH_2-Rf-CH_2-O-CH_2-CH=CH_2 \quad (I)$$

$$Rf: -CF_2(OC_2F_4)_p(OCF_2)_qOCF_2-$$

wherein p/q is 0.9 and p+q is about 45 on average, 12.9 g of the polydimethylsiloxane having SiH bonds at both ends represented by the following formula (II), and

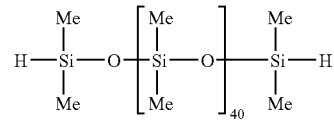

(II)

150 g of m-xylene hexafluoride and heated at 90° C. while stirring. To the mixture obtained, 0.0442 g, i.e., $1.1 \times 10^{-7}$ mole as Pt, of a solution of a complex of chloroplatinic acid with a vinylsiloxane in toluene was added dropwise and heated at 90° C. for 6 hours. Then, 2.5 g of a 1:1 adduct of tetramethyldisiloxane (HM) and vinyltrimethoxysilane (VMS) of the following formula (III), hereinafter referred to as HM-VMS adduct, was added dropwise and heated at 90° C. for 2 hours.

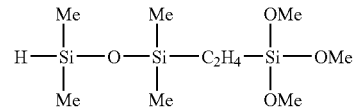

(III)

Subsequently, the solvent, i.e., m-xylene hexafluoride, unreacted pentamethyldisiloxane and HM-VMS adduct were removed by vacuum evaporation to obtain 32.5 g of a perfluoropolyether-polyorganosiloxane copolymer in the form of white cloudy liquid, hereinafter referred to as Copolymer 1.

The aforesaid HM-VMS adduct was prepared by the following method. In a reactor, 40 g of tetramethyldisiloxane (HM) and 40 g of toluene were mixed and heated to 80° C., to which 44.2 g of vinyltrimethoxysilane (VMS) and 0.0442 g, i.e., $1.1 \times 10^{-7}$ mole as Pt, of a solution of a complex of chloroplatinic acid with a vinylsiloxane in toluene were added dropwise slowly. By purifying the reaction mixture thus obtained by evaporation, 84 g of HM-VMS adducts was obtained.

Copolymer 1 showed a $^1$H-NMR spectrum as shown in FIG. 1 with the following chemical shifts from TMS.

| | | |
|---|---|---|
| —SiCH$_3$, 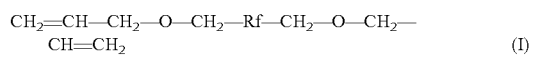 | | 0.01~0.26 ppm |
| ≡SiCH$_2$CH$_2$Si≡ | | 0.48 ppm |
| —CH—<br>\|<br>CH$_3$ | | 1.01 ppm |
| —CH$_2$CH$_2$Si≡ | | 1.59 ppm |
| —SiOCH$_3$ | | 3.47~3.49 ppm |
| —CH$_2$OCH$_2$— | | 3.67 ppm |

From the above data, Copolymer 1 was found to have the following structure:

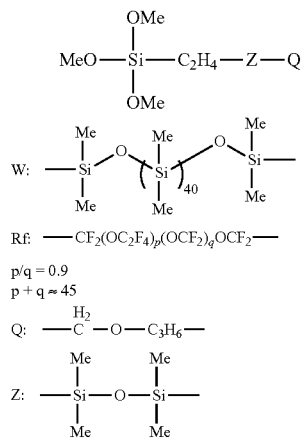

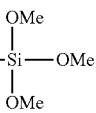

In the above formula, Rf is bound to the methylene group of Q.

Example 2

The procedures of Example 1 were repeated to obtain Copolymer 2 except that a polydimethylsiloxane having 18 dimethylsiloxane repeating units in place of the polydimethylsiloxane of the formula (II) having 40 dimethylsiloxane repeating units was used.

Figure 2:
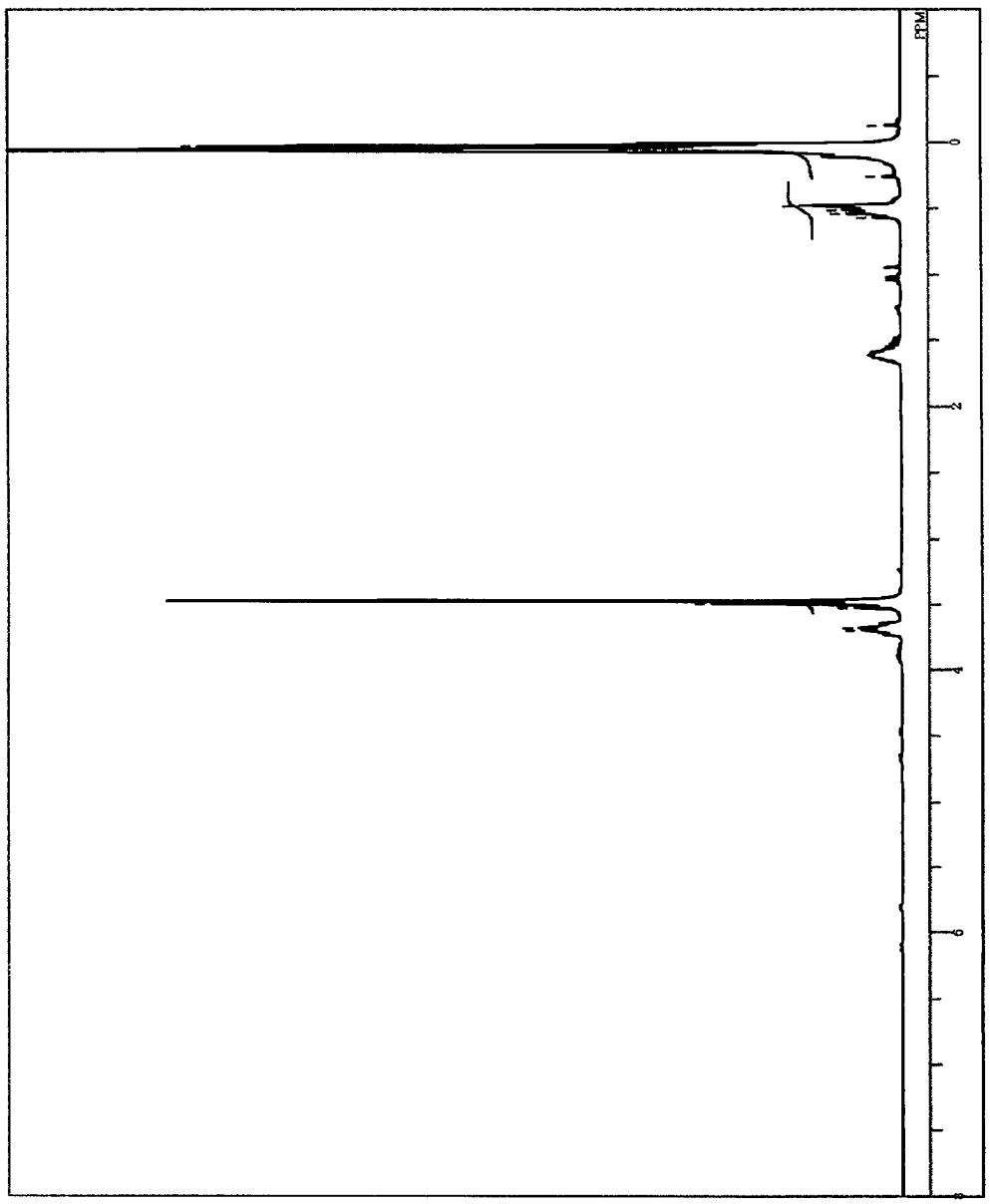
FIG. 2 is a $^1$H-NMR chart of Copolymer 2 prepared in Example 2.
Figure 3:
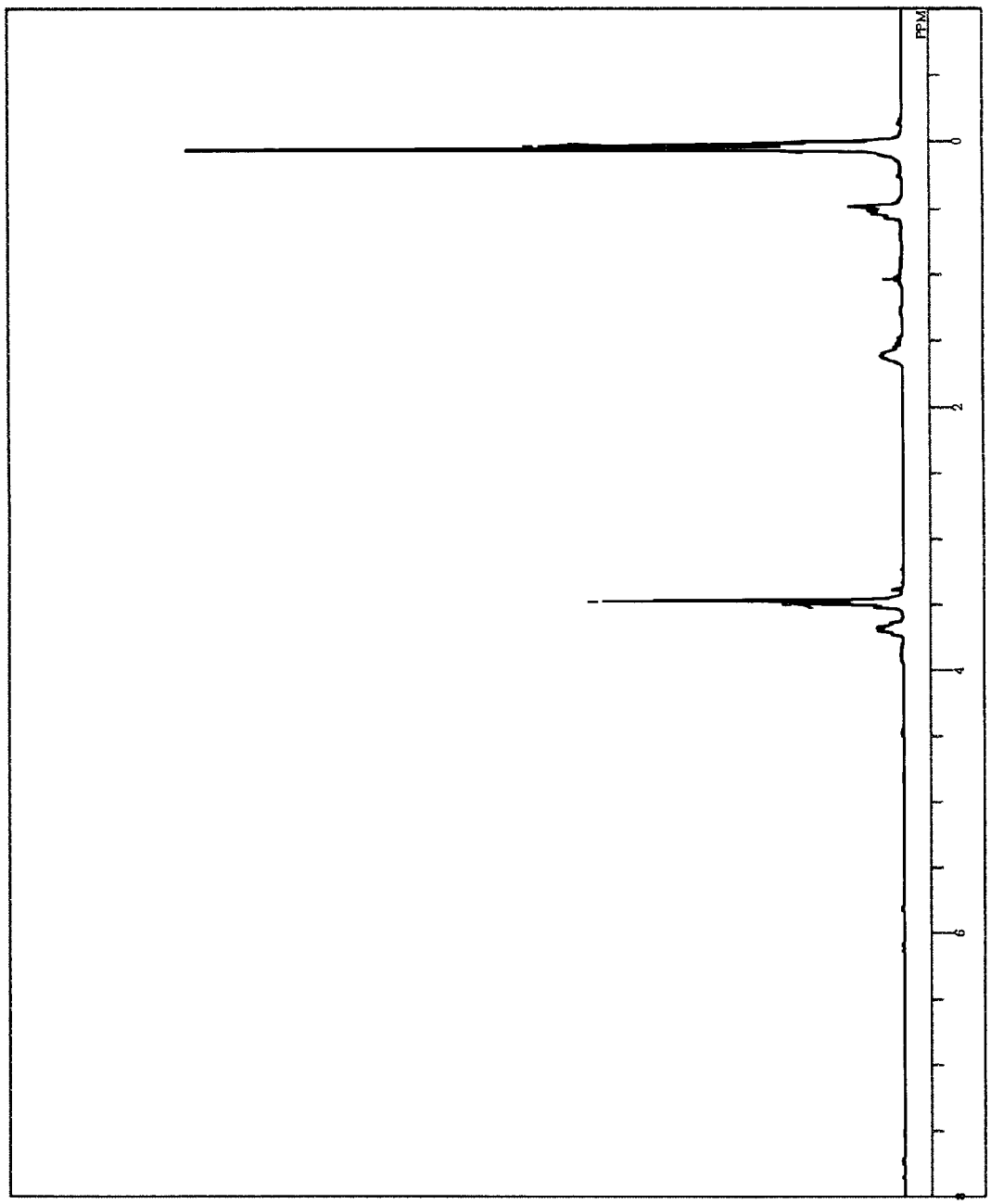
FIG. 3 is a $^1$H-NMR chart of Copolymer 3 prepared in Example 3.
Figure 4:
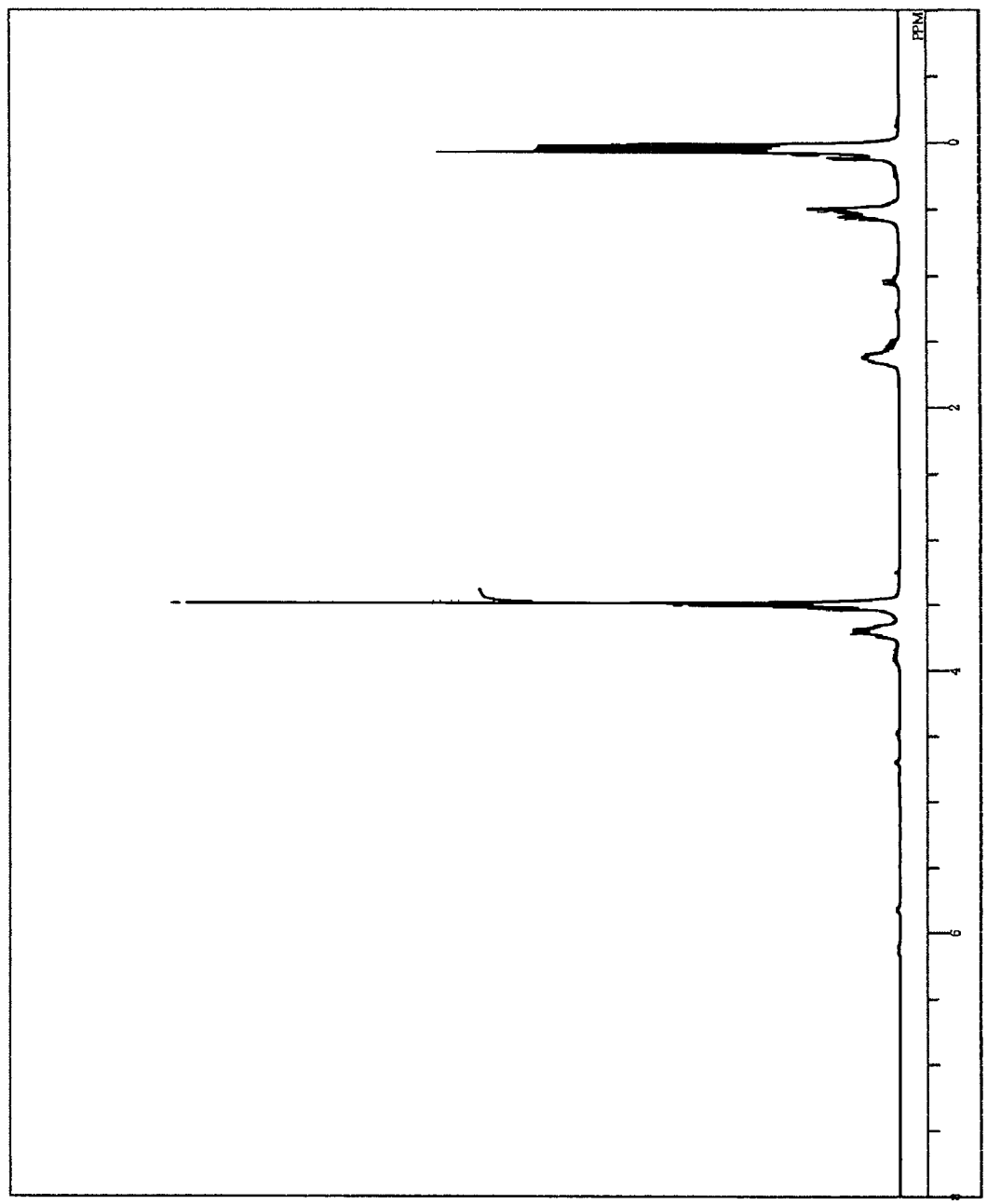
FIG. 4 is a $^1$H-NMR chart of Copolymer 4 prepared in Example 4.
Figure 5:
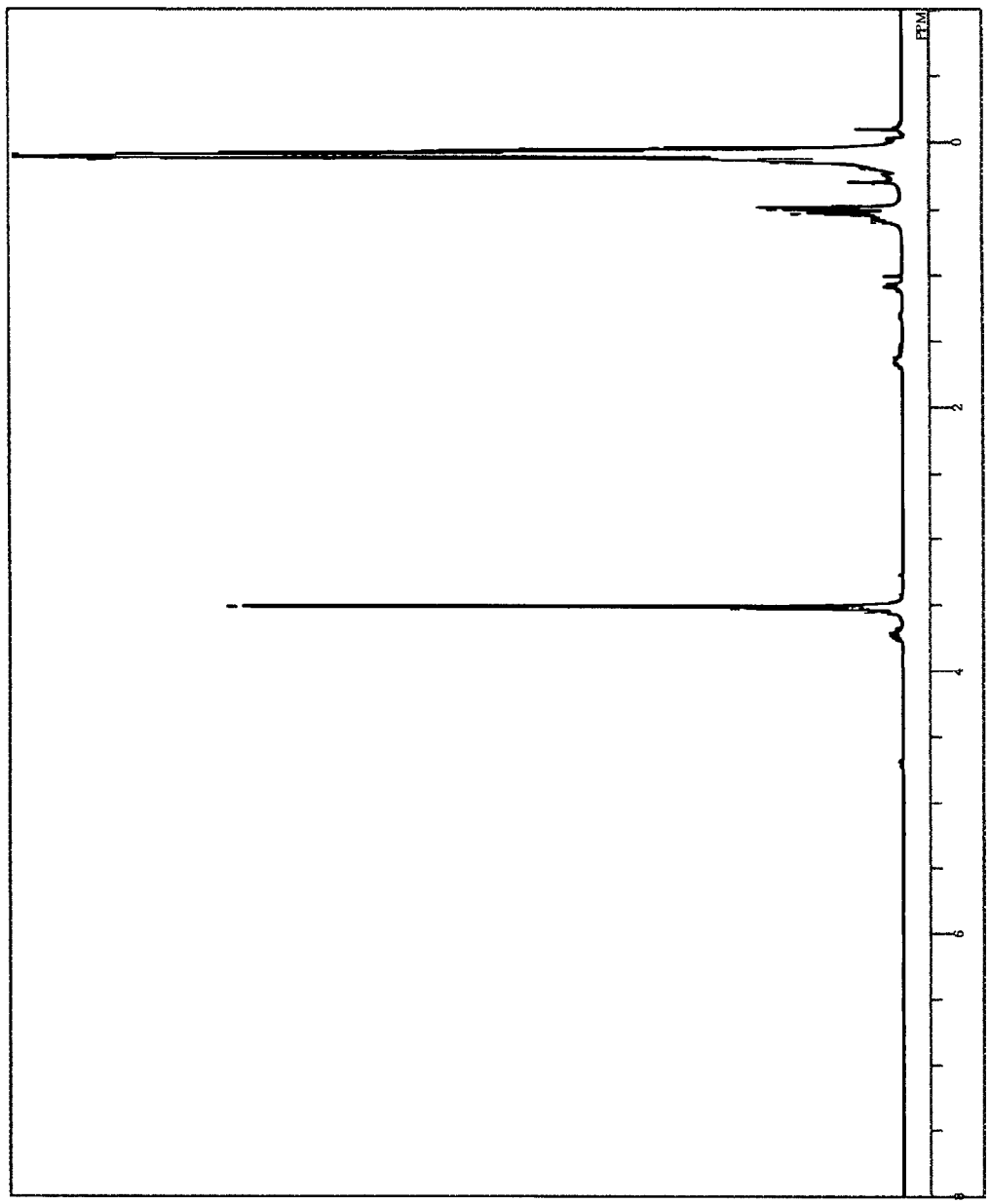
FIG. 5 is a $^1$H-NMR chart of Copolymer 5 prepared in Example 5.

Copolymer 2 showed a $^1$H-NMR spectrum as shown in FIG. 2 with the following chemical shifts from TMS.

| | |
|---|---|
| —SiCH$_3$, >CH— | 0.01~0.26 ppm |
| ≡SiCH$_2$CH$_2$Si≡ | 0.48~0.57 ppm |
| >CH—CH$_3$ | 0.95 ppm |
| —CH$_2$CH$_2$Si≡ | 1.61 ppm |
| —SiOCH$_3$ | 3.47~3.52 ppm |
| —CH$_2$OCH$_2$— | 3.68~3.70 ppm |

From the above data, Copolymer 2 was found to have the following structure:

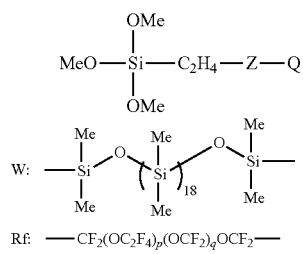

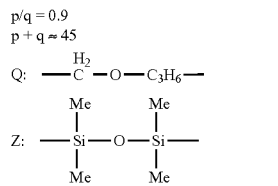

In the above formula, Rf is bound to the methylene group of Q.

Example 3

The procedures of Example 1 were repeated to obtain Copolymer 3 except that a polydimethylsiloxane having eight dimethylsiloxane repeating units in place of the polydimethylsiloxane of the formula (II) having 40 dimethylsiloxane repeating units was used.

Copolymer 3 showed a $^1$H-NMR spectrum as shown in FIG. 2 with the following chemical shifts from TMS.

| | |
|---|---|
| —SiCH$_3$, >CH— | 0~0.07 ppm |
| ≡SiCH$_2$CH$_2$Si≡ | 0.48 ppm |
| >CH—CH$_3$ | 1.03 ppm |
| —CH$_2$CH$_2$Si≡ | 1.61 ppm |
| —SiOCH$_3$ | 3.47~3.50 ppm |
| —CH$_2$OCH$_2$— | 3.67 ppmm |

From the above data, Copolymer 3 was found to have the following structure:

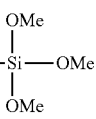

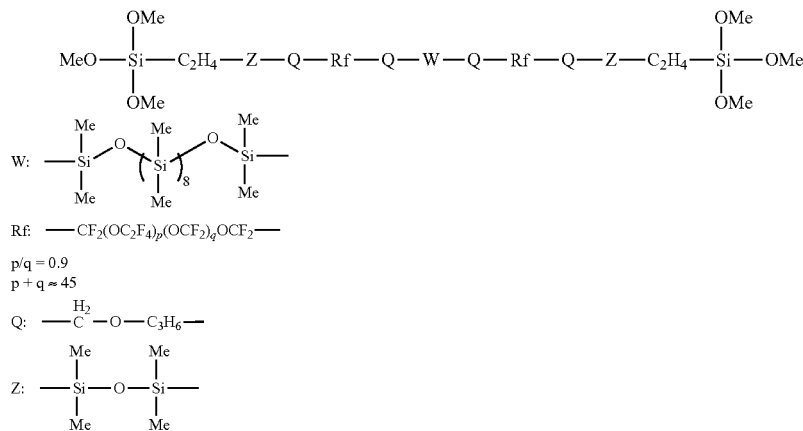

In the above formula, Rf is bound to the methylene group of Q.

Example 4

The procedures of Example 1 were repeated to obtain Copolymer 4 except that a polydimethylsiloxane having one dimethylsiloxane repeating unit in place of the polydimethylsiloxane of the formula (II) having 40 dimethylsiloxane repeating units was used.

Copolymer 4 showed a $^1$H-NMR spectrum as shown in FIG. 2 with the following chemical shifts from TMS.

| | | |
|---|---|---|
| —SiCH$_3$, —CH— | | 0.01~0.13 ppm |
| ≡SiCH$_2$CH$_2$Si≡ | | 0.50~0.58 ppm |
| —CH— CH$_3$ | | 1.04 ppm |
| —CH$_2$CH$_2$Si≡ | | 1.63 ppm |

-continued

| | |
|---|---|
| —SiOCH$_3$ | 3.49~3.53 ppm |
| —CH$_2$OCH$_2$— | 3.71 ppm |

From the above data, Copolymer 4 was found to have the following structure:

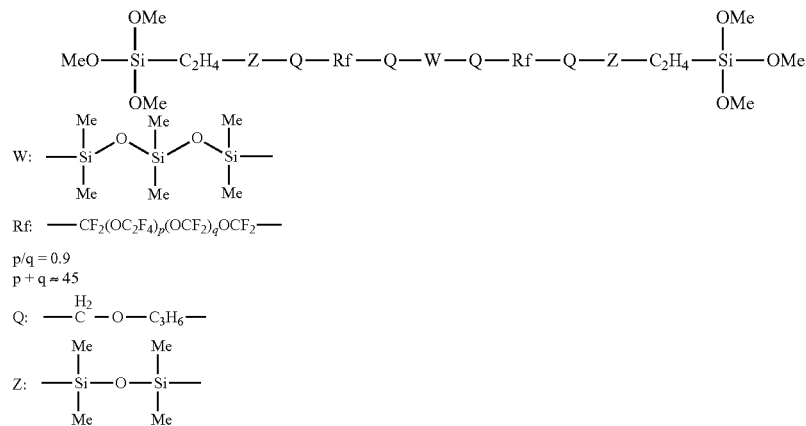

In the above formula, Rf is bound to the methylene group of Q.

Example 5

The procedures of Example 1 were repeated to obtain Copolymer 5 except that a polydimethylsiloxane having 145 dimethylsiloxane repeating unit in place of the polydimethylsiloxane of the formula (II) having 40 dimethylsiloxane repeating units was used.

Copolymer 5 showed a $^1$H-NMR spectrum as shown in FIG. 2 with the following chemical shifts from TMS.

| | | |
|---|---|---|
| —SiCH$_3$, —CH— | | 0.04~0.15 ppm |
| ≡SiCH$_2$CH$_2$Si≡ | | 0.48~0.60 ppm |

| | |
|---|---|
| —CH—<br>\|<br>CH₃ | 1.01~1.09 ppm |
| —CH₂CH₂Si≡ | 1.66 ppm |
| —SiOCH₃ | 3.51~3.56 ppm |
| —CH₂OCH₂— | 3.75 ppm |

From the above data, Copolymer 5 was found to have the following structure:

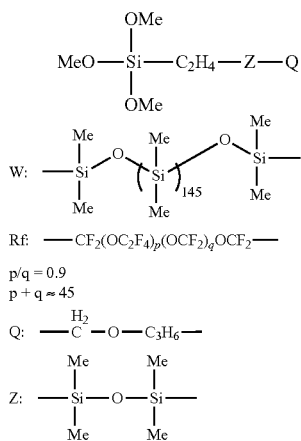

W: 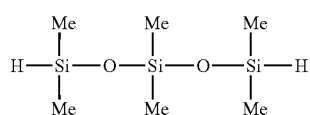

Rf: —CF₂(OC₂F₄)$_p$(OCF₂)$_q$OCF₂— p/q = 0.9
p + q ≈ 45

Q: —C$_{H_2}$—O—C₃H₆—

Z: 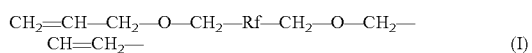

In the above formula, Rf is bound to the methylene group of Q.

Example 6

In a reactor, were placed 25 g of perfluoropolyether compound having unsaturated bonds at both ends represented by the following formula (I), CH₂=CH—CH₂—O—CH₂—Rf—CH₂—O—CH₂—CH=CH₂—  (I)

Rf: —CF₂(OC₂F₄)$_p$(OCF₂)$_q$OCF₂— wherein p/q is 0.9 and p+q is about 45 on average, 13 g of polydimethylsiloxane having SiH bonds at both ends represented by the following formula (IV), and

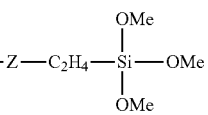

40 g of m-xylene hexafluoride and heated at 90° C. while stirring. To the mixture obtained, 0.0442 g, i.e., 1.1×10⁻⁷ mole as Pt, of a solution of a complex of chloroplatinic acid with a vinylsiloxane in toluene was added dropwise and heated at 90° C. for 2 hours. The mixture obtained was then subjected to vacuum stripping. To the residue of the stripping, 50 g of a polydimethylsiloxane having α-unsaturated bonds at both ends, and 150 g of m-xylene hexafluoride were added and heated at 90° C., to which 0.0442 g, i.e., 1.1×10⁻⁷ mole as Pt, of a solution of a complex of chloroplatinic acid with a vinylsiloxane in toluene was added dropwise and heated at 90° C. for 6 hours. Then, 5.6 g of HM-VMS adduct of the above formula (III) was added dropwise and heated at 90° C. for 2 hours. Subsequently, the solvent, unreacted pentamethyldisiloxane and HM-VMS adduct were removed by vacuum evaporation to obtain 35.3 g of a perfluoropolyether-polyorganosiloxane copolymer in the form of white cloudy liquid, hereinafter referred to as Copolymer 6.

Figure 6:
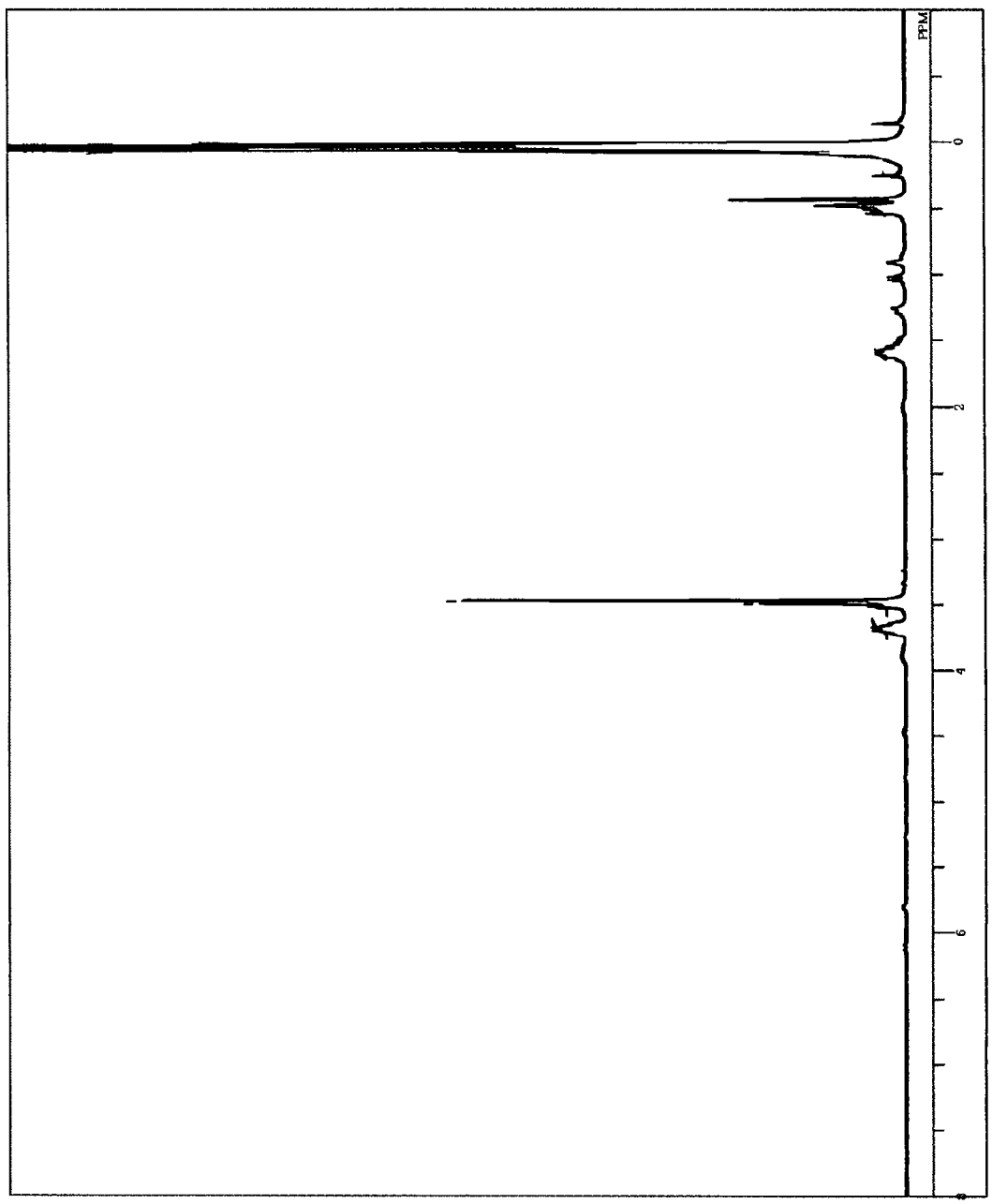
FIG. 6 is a $^1$H-NMR chart of Copolymer 6 prepared in Example 6.

Copolymer 6 showed a ¹H-NMR spectrum as shown in FIG. 6 with the following chemical shifts from TMS.

| | |
|---|---|
| —SiCH₃, —CH— | 0.01~0.26 ppm |
| ≡SiCH₂CH₂Si≡ | 0.44~0.48 ppm |
| —CH—<br>\|<br>CH₃ | 1.02~1.04 ppm |
| —CH₂CH₂Si≡ | 1.60 ppm |
| —SiOCH₃ | 3.46~3.49 ppm |
| —CH₂OCH₂— | 3.67 ppm |

From the above data, Copolymer 6 was found to have the following structure:

MeO—Si(OMe)(OMe)—C₂H₄—W—Q—Rf—Q—W—C₂H₄—Si(OMe)(OMe)—OMe

Rf: —CF₂(OC₂F₄)$_p$(OCF₂)$_q$OCF₂— p/q = 0.9
p + q ≈ 45

W: 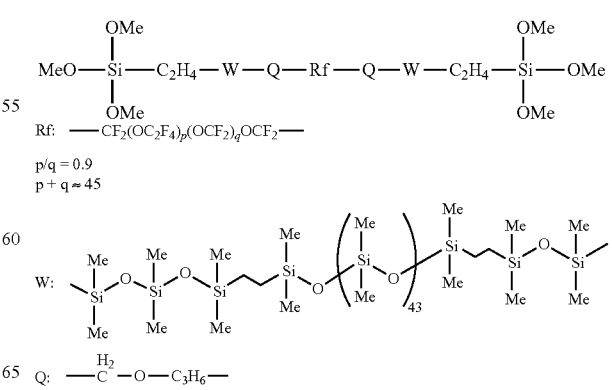

Q: —C$_{H_2}$—O—C₃H₆—

Example 7

In a reactor, were placed 25 g of perfluoropolyether compound having unsaturated bonds at both ends represented by the following formula (I),

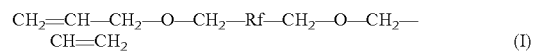

Rf: —$CF_2(OC_2F_4)_p(OCF_2)_qOCF_2$— wherein p/q is 0.9 and p+q is about 45 on average, 13 g of the polydimethylsiloxane having SiH bonds at both ends of the following formula (IV), and

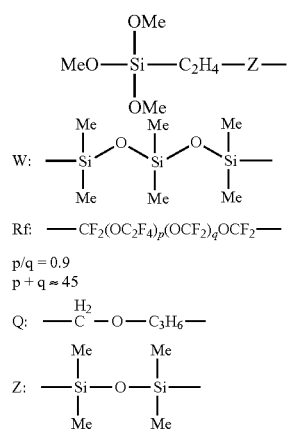

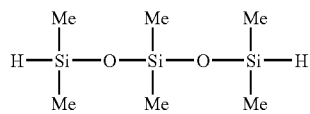

40 g of m-xylene hexafluoride and heated at 90° C. while stirring. To the mixture obtained, 0.0442 g, i.e., $1.1 \times 10^{-7}$ mole as Pt, of a solution of a complex of chloroplatinic acid with a vinylsiloxane in toluene was added dropwise and heated at 90° C. for 2 hours. The mixture obtained was then subjected to vacuum stripping. To the residue of the stripping, 50 g of a polydimethylsiloxane having α-unsaturated bonds at both ends of the above formula (I), and 100 g of m-xylene hexafluoride were added and heated at 90° C., to which 0.0442 g, i.e., $1.1 \times 10^{-7}$ mole as Pt, of a solution of a complex of chloroplatinic acid with a vinylsiloxane in toluene was added dropwise and heated at 90° C. for 6 hours. Then, 5.6 g of HM-VMS adduct of the above formula (III) was added dropwise and heated at 90° C. for 2 hours. Subsequently, the solvent, unreacted pentamethyldisiloxane and HM-VMS adduct were removed by vacuum evaporation to obtain 52.3 g of a perfluoropolyether-polyorganosiloxane copolymer in the form of white cloudy liquid, hereinafter referred to as Copolymer 7.

Figure 7:
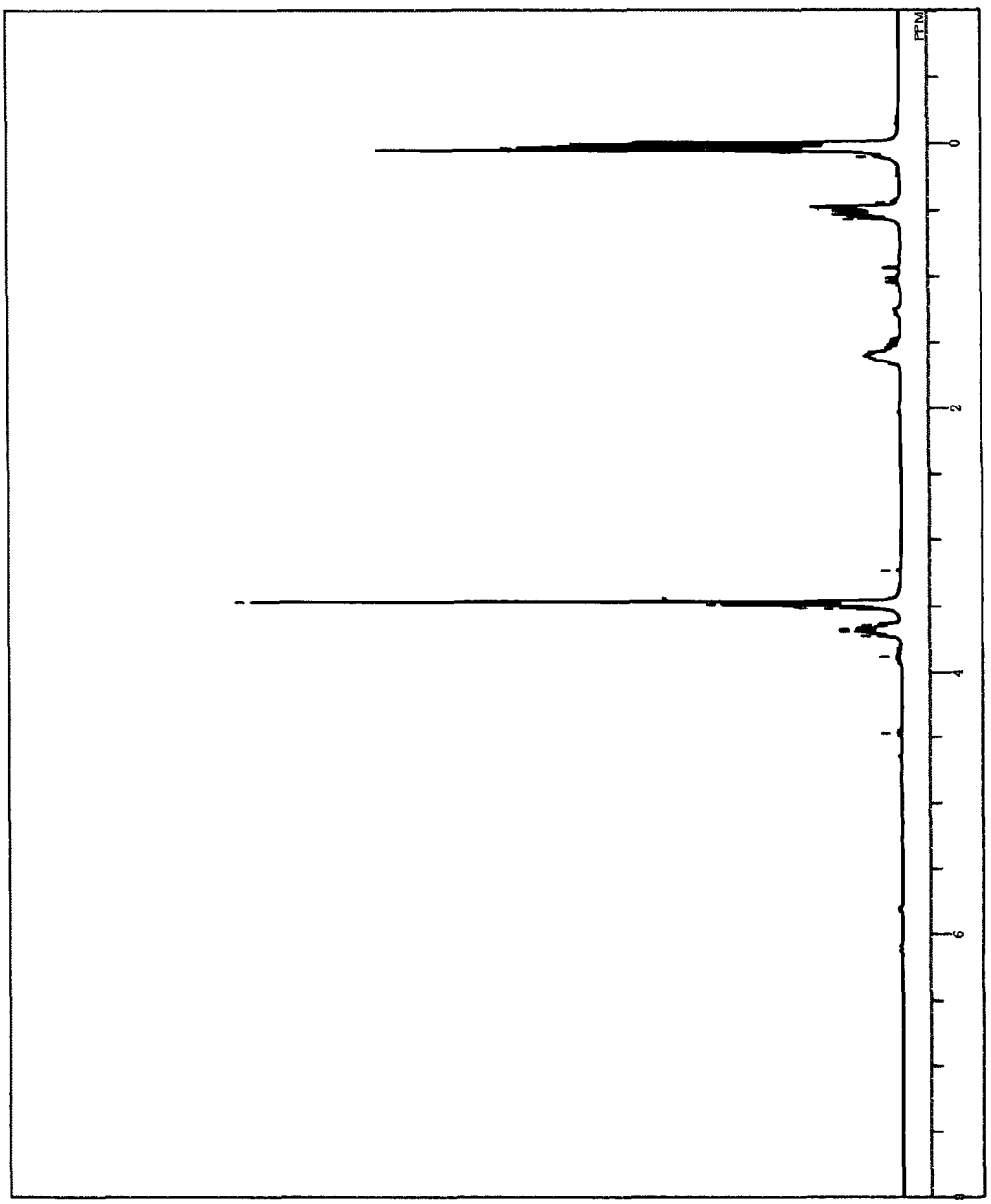
FIG. 7 is a $^1$H-NMR chart of Copolymer 7 prepared in Example 7.

Copolymer 7 showed a $^1$H-NMR spectrum as shown in FIG. 7 with the following chemical shifts from TMS.

| | | |
|---|---|---|
| —SiCH$_3$, | —CH— | 0.01~0.10 ppm |
| ≡SiCH$_2$CH$_2$Si≡ | | 0.44~0.56 ppm |
| —CH— <br> \| <br> CH$_3$ | | 1.02~1.04 ppm |
| —CH$_2$CH$_2$Si≡ | | 1.48~1.61 ppm |
| —SiOCH$_3$ | | 3.47~3.51 ppm |
| —CH$_2$OCH$_2$— | | 3.64~3.88 ppm |

From the above data, Copolymer 7 was found to have the following structure:

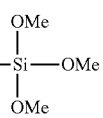

The copolymers 1-7 were evaluated by the following methods.

Solubility in Diisopropyl Ether

Solubility of Copolymers 1-7 was evaluated by mixing 20 parts by weight of each of the Copolymer with 80 parts by weight of diisopropyl ether. Results are as shown in Table 1 in which the "A" indicates that the copolymer completely dissolved in diisopropyl ether to give a transparent solution, and "B" indicates that the copolymer did not dissolve completely to give a cloudy solution.

Silicon Content

A silicon content of each copolymer was calculated from silicon contents of starting siloxanes.

Preparation of Surface Treatment Compositions

Surface treatment compositions were prepared by dissolving each of Copolymers 1 to 7, except Copolymers 5 and 6, in ethylperfluorobutyl ether, HFE-7200, ex Sumitomo 3M Co., to prepare 0.3 wt % solution. Each of Copolymer 5 and 6 was dissolved in the solvent, AK225, ex Asahi Glass Co. Ltd.

Preparation of Cured Coatings

A slide glass was dipped in a surface treatment composition for 10 seconds and pulled up at pulling speed of 150 mm/min. The slide glass coated with the surface treatment composition thus obtained was kept in an environment of a temperature of 25° C. and a relative humidity of 40% for 24 hours. A cured coating thus obtained was evaluated according to the following methods.

Slickness of the Coating Surface

Seven panelists scrubbed a coating surface with a finger covered with a sheet of nonwoven cloth (Bencot, ex Asahi kasei Co.) and rated slickness of the coating surface according to the following criteria:

A: Much slicker than the coating made from Comparative Compound 1 represented by the formula shown below.

B: Slicker than the coating layer made from Comparative Compound 1.

C: As slick as the coating made from Comparative Compound 1.

D: Less slick than the coating made from Comparative Compound 1.

Slickness of the Coating Surface after Scrubbing

Using a rubbing tester, ex Shinto Scientific Co., Ltd., a cured coating was scrubbed under the following conditions and the scrubbed surface was evaluated in the same manner as described above.

Test environment: 25° C., relative humidity of 40%

Scrubbing material: The coating layers were scrubbed with a tip of the tester which was covered by eight sheets of nonwoven cloth (1.5 cm×1.5 cm) laid top on another and fixed by a rubber band.

Scrub distance (one way): 4 cm

Scrub speed: 500 cm/min

Load: 1 kg

Number of scrubbing: 2,000 times

Comparative Examples 1-5

Using the following Comparative Compounds 1-5, Comparative surface treatment compositions were prepared and evaluated in the same manner as described above.

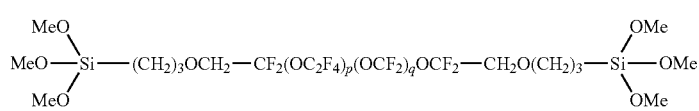

(p/q is 0.9, and p+q is about 45 on average)

Comparative Compound 1

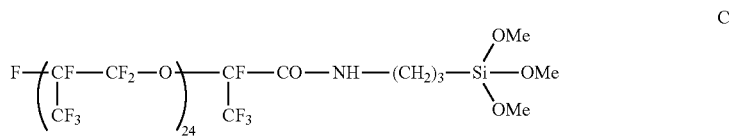

Comparative Compound 2

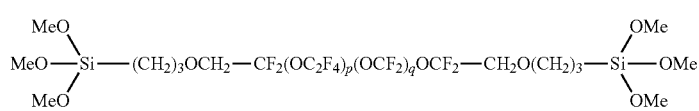

Comparative Compound 3

(p/q is 0.9, and p+q is about 22 on average)

Comparative Compound 4

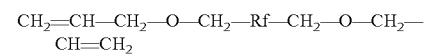

(I)

Rf: —CF$_2$(OC$_2$F$_4$)$_p$(OCF$_2$)$_q$OCF$_2$—

(p/q is 0.9, and p+q is about 45 on average)

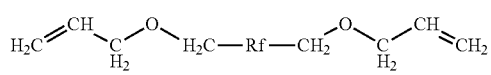

Rf: —Rf$^1$—R—Rf$^1$—

Rf$^1$: —CF$_2$(OC$_2$F$_4$)$_p$(OCF$_2$)$_q$OCF$_2$— p/q = 0.9 p + q ≈ 45

R:

$$\text{—O—(CH}_2)_3\text{—}\underset{\underset{\text{Me}}{|}}{\overset{\overset{\text{Me}}{|}}{\text{Si}}}\text{—O—}\left(\underset{\underset{\text{Me}}{|}}{\overset{\overset{\text{Me}}{|}}{\text{Si}}}\text{—O}\right)_{40}\underset{\underset{\text{Me}}{|}}{\overset{\overset{\text{Me}}{|}}{\text{Si}}}\text{—(CH}_2)_3\text{—O—}$$

The results of the evaluation are as shown in Table 1.

TABLE 1

| | Si content, wt % | Solubility | Slickness | Slickness after scrubbing |
|---|---|---|---|---|
| Example 1 | 11 | A | A | A |
| Example 2 | 7 | A | B | B |
| Example 3 | 5 | B | B | B |
| Example 4 | 3 | B | B | B |
| Example 5 | 22 | A | A | A |

TABLE 1-continued

| | Si content, wt % | Solubility | Slickness | Slickness after scrubbing |
|---|---|---|---|---|
| Example 6 | 24 | A | A | B |
| Example 7 | 3 | B | B | B |
| Comparative Example 1 | 1 | B | C | C |
| Comparative Example 2 | 1 | B | D | D |
| Comparative Example 3 | 2 | B | D | D |
| Comparative Example 4 | 0 | B | C | D |
| Comparative Example 5 | 10 | A | A | D |

As can be seen from Table 1, Comparative Compounds 1-4, which lack a polyorganosiloxane block, showed worse solubility and the coatings therefrom were less slick than those of Examples. Comparative Compound 5 lacks a hydrolyzable group and the coating therefrom lost the slickness by scrubbing. In contrast, the coatings from the copolymers of the present invention were slick which was not degraded by scrubbing. The copolymers, particularly Copolymers 1, 2, 5 and 6 with higher silicon content, showed good solubility, too.

As described above, the perfluoropolyether-polyorganosiloxane copolymer of the present invention is useful for preparing coating whose surface is slick and resistant to scrubbing.

The invention claimed is:

1. A surface treatment composition consisting essentially of a perfluoropolyether-polyorganosiloxane copolymer and/or a partial condensate of hydrolyzates thereof;
   a solvent; and
   optionally 0.01 to 5 parts by weight of a hydrolysis and condensation catalyst selected from the group consisting of organic tin compounds and organic titanium compounds, per 100 parts by weight of the perfluoropolyether-polyorganosiloxane copolymer and/or the partial condensate of hydrolyzates thereof;
   wherein a concentration of the perfluoropolyether-polyorganosiloxane copolymer and/or the partial condensate of hydrolyzates thereof is in the range of from 0.01 to 50 wt %,
   wherein the perfluoropolyether-polyorganosiloxane copolymer comprising at least one perfluoropolyether block, at least one polyorganosiloxane block which may have a silalkylene group, and two monovalent groups represented by the following formula (1), each one at both ends of the copolymer,

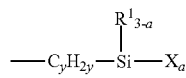

(1)

wherein X is a hydrolyzable group, $R^1$ is an alkyl group having 1 to 4 carbon atoms or a phenyl group, y is an integer of from 1 to 5, and a is an integer of 2 or 3,
said copolymer having a number average molecular weight, reduced to polystyrene, of from 7,000 to 25,000;
wherein a backbone of the perfluoropolyether-polyorganosiloxane copolymer is represented by the following formula (2)

—(Rf-Q)$_h$-(W-Q-Rf-Q)$_g$-W-(Q-Rf)$_i$—  (2)

wherein Rf represents the perfluoropolyether block, W represents the linear polyorganosiloxane block, Q is a $C_{2-12}$ divalent connecting group which may have one or more oxygen and/or nitrogen atom, g is an integer of from 0 to 2, and h and i each are integers of 0 or 1; and
wherein silicon atoms are contained in an amount of from 3 to 30 wt %, based on a weight of the perfluoropolyether-polyorganosiloxane copolymer.

2. The surface treatment composition according to claim 1, wherein the composition contains said hydrolysis and condensation catalyst.

3. The surface treatment composition according to claim 1, wherein the solvent is one or more selected from the group consisting of fluorine-modified aliphatic hydrocarbon solvents, fluorine-modified aromatic hydrocarbon solvents, fluorine-modified ether solvents, fluorine-modified alkylamine solvents, hydrocarbon solvents, and ketone solvents.

4. The surface treatment composition according to claim 1, wherein the backbone is represented by the following formula (2-1)

—Rf-Q-W-Q-Rf—  (2-1)

wherein Rf, W, and Q are as defined in claim 1.

5. The surface treatment composition according to claim 1, wherein the backbone is represented by the following formula (2-2)

—W-Q-Rf-Q-W—  (2-2)

wherein Rf, W, and Q are as defined in claim 1.

6. The surface treatment composition according to claim 1, wherein the backbone is represented by the formula (2) with both h and i being 1 or both h and i being 0, and the monovalent group represented by the formula (1) is bound to a carbon atom in the perfluoropolyether block or to a silicon atom of the polyorganosiloxane block via a divalent group represented by the following formula -Q(Z)$_k$- wherein Q is the divalent connecting group as defined above, Z is a divalent polyorganosiloxane residue which has 1 to 8 silicon atoms and may have a silalkylene group, k is an integer of 0 or 1, and the monovalent group represented by the formula (1) is bound to a silicon atom of Z when k is 1.

7. The surface treatment composition according to claim 1, wherein the perfluoropolyether block is represented by the following formula (3), (4), or (5):

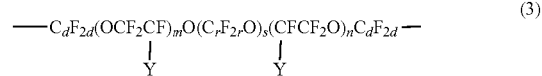

(3)

wherein Y may be the same with or different from each other and is a fluorine atom or a $CF_3$ group, r is an integer of from 2 to 6, d is an integer of from 1 to 3, each of m and n is an integer of from 0 to 200 with m+n ranging from 2 to 200, s is an integer of from 0 to 6, and the repeating units may be bonded randomly;

$C_dF_{2d}(CF_2CF_2CF_2O)_lC_dF_{2d}$—  (4)

wherein l is an integer of from 1 to 200 and d is an integer of from 1 to 3; and

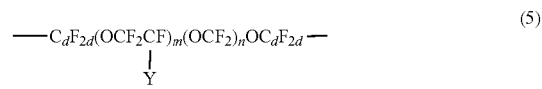

(5)

wherein Y is a fluorine atom or a $CF_3$ group, d is an integer of from 1 to 3, each of m and n is an integer of from 0 to 200 with m+n ranging from 2 to 200, and the repeating units may be bonded randomly.

8. The surface treatment composition according to claim 1, wherein the perfluoropolyether block is represented by the following general formula (6)

—$CF_2(OC_2F_4)_m(OCF_2)_nOCF_2$—  (6)

wherein m is an integer of from 0 to 50, n is an integer of from 0 to 50 with m+n ranging from 2 to 60.

9. The surface treatment composition according to claim 1, wherein the polyorganosiloxane block is a linear polyorganosiloxane block having 2 to 150 repeating units represented by the following formula (7)

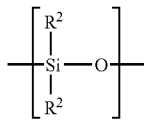

(7)

wherein R² may be the same with or different from each other and is an alkyl group having 1 to 4 carbon atoms or a phenyl group.

10. The surface treatment composition according to claim 1, wherein Q is represented by the following formula:

—CH₂OCH₂CH₂CH₂—.

11. The surface treatment composition according to claim 1, wherein X is an alkoxy group having 1 to 10 carbon atoms.

12. The surface treatment composition according to claim 1, wherein the backbone is represented by the following formula (2-3)

—Rf-Q-W-Q-Rf-Q-W-Q-Rf— (2-3)

wherein Rf, W, and Q are as defined in claim 1.

13. The surface treatment composition according to claim 1, wherein the composition does not contain said hydrolysis and condensation catalyst.

* * * * *